July 2, 1940.         A. R. SCHOENKY         2,206,129
METHOD FOR USE IN THE MANUFACTURE OF SHOES
Filed Aug. 21, 1939
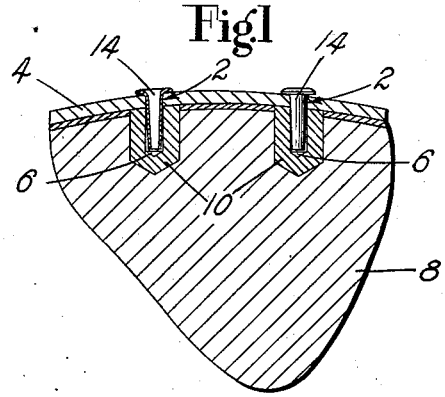
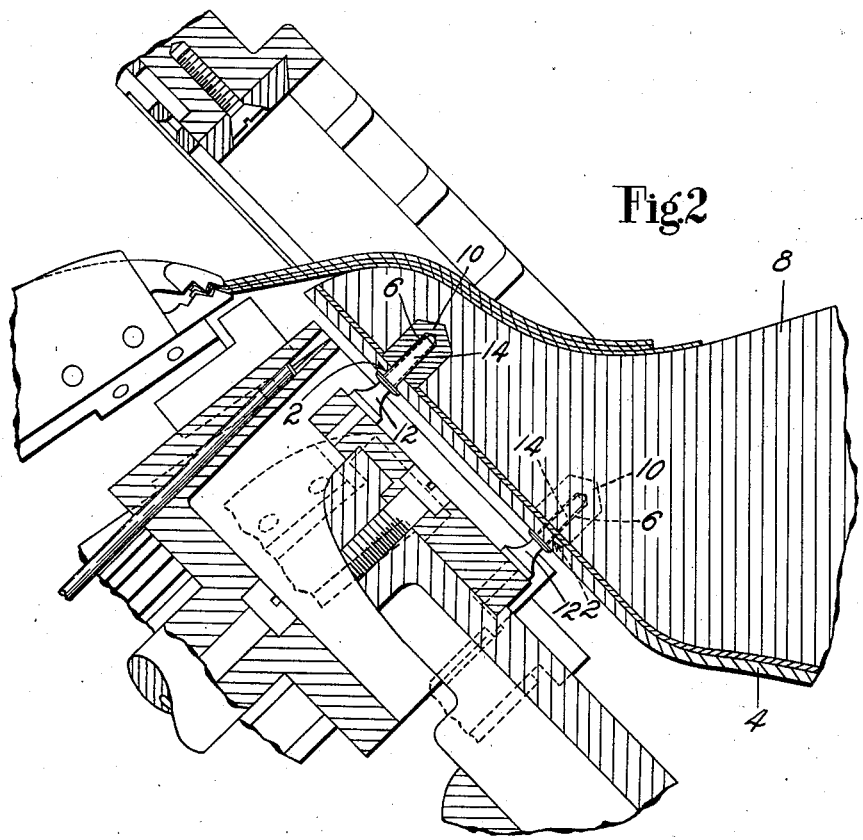
INVENTOR
August R. Schoenky
By his Attorney
Victor Cobb Patented July 2, 1940

2,206,129

UNITED STATES PATENT OFFICE 2,206,129

METHOD FOR USE IN THE MANUFACTURE OF SHOES

August R. Schoenky, Swampscott, Mass., assignor to United Shoe Machinery Corporation, Borough of Flemington, N. J., a corporation of New Jersey Application August 21, 1939, Serial No. 291,125

5 Claims. (Cl. 12—142)

This invention relates to methods for use in the manufacture of shoes, and more particularly to methods of positioning insoles on lasts and of positioning the lasts and insoles in shoe machines.

Lasts and their shoe materials have been positioned heretofore in definitely predetermined relation to the operating instrumentalities of shoe machines by the use of pins extending into holes in each last through holes in an insole on the last, as disclosed in United States Letters Patent No. 1,674,060, granted on June 19, 1928, on an application of A. F. Pym. Such holes in the insole aline with the corresponding holes in the last when the insole is in proper relation to the last, and accordingly the insole may be accurately positioned and held on the last when it is assembled thereon by the use of a device such as disclosed in Letters Patent No. 1,884,882, granted on October 25, 1932 on an application of mine. That device extends through holes in the insole into corresponding holes in the last and holds the insole against the bottom of the last. Obviously it must be removed before the work is presented to a machine having work-positioning pins arranged to enter the holes in the last, and accordingly it cannot be used if the work is to be presented, immediately after the assembling operation, to a pulling-over or other machine having such pins.

The present inveniton provides a method such that the function of pins for positioning the work in a shoe machine by extending into holes in the insole and last is not interfered with by the presence of insole-positioning means utilizing the same holes, or some of them. In accordance with the illustrative disclosure the insole is positioned on the last by the use of eyelets inserted in the holes in the insole and in the corresponding holes in the last, the heads of the eyelets engaging the insole and their body portions tightly fitting the holes in the last so that the insole is held by the eyelets effectively in its proper relation to the last. With the eyelets still in place the work is presented to a shoe machine having work-positioning pins, the pins entering the holes in the eyelets. Such a machine may be a pulling-over machine used immediately after the assembling operation, and thereafter the work may be presented to one or more other machines having such pins while the eyelets remain in place. It will be understood that before an outsole is applied to the shoe the eyelets will be removed.

The novel method will now be more particularly described with reference to the accompanying drawing and thereafter pointed out in the claims.

In the drawing,

Fig. 1 is a cross-sectional view of a last and an insole thereon, illustrating how the insole is positioned and held by the use of eyelets; and Fig. 2 is a view mainly in vertical section of a portion of a pulling-over and toe-lasting machine of the character disclosed in Letters Patent No. 1,980,435, granted on November 13, 1934, on an application of C. F. Pym et al., illustrating how the work is positioned in such a machine when eyelets are used to position the insole as illustrated in Fig. 1.

In accordance with the method disclosed in the above-mentioned Letters Patent No. 1,674,060, a plurality of holes 2 are punched in an insole 4 in accurately predetermined relation to the edge contour of the insole, and a plurality of holes 6 are provided in the last 8 also in accurately predetermined relation to its contour, so that the holes in the insole will aline with the corresponding holes in the last when the insole is in proper relation to the last. As illustrated, three such holes are provided in the forepart of the insole and three corresponding holes in the forepart of the last, the holes in the last being formed in metal bushings 10 inserted in sockets bored in the last. The last and insole thus prepared are positioned in a shoe machine in accurately predetermined relation to the operating instrumentalities of the machine by pins extending through the holes in the insole into the holes in the last. Fig. 2 shows such pins 12 in a machine of the character disclosed in the above-mentioned Letters Patent No. 1,980,435, the machine having means for pulling an upper over the last, means for wiping the toe-end portion of the upper into lasted position and means for driving tacks to fasten it in that position.

For purposes of this invention the insole is positioned and held on the last by the use of eyelets 14 extending through the holes 2 in the insole into the holes 6 in the last, the heads of the eyelets engaging the outer face of the insole and their body portions tightly fitting the holes in the last, so that the insole is held effectively in place on the last as illustrated in Fig. 1. The eyelets may, if desired, be inserted in the holes in the insole before the insole is mounted on the last and may be pressed into the holes in the last in mounting the insole thereon. Use of the eyelets eliminates any need of a tack to fasten the forepart of the insole to the last, but a tack may be used for this purpose at the shank and at the heel end if desired. With the eyelets in place, the work may be positioned in any machine in which it is advantageous to do so by the use of pins extending into the holes in the last, since the pins will enter the eyelets. It will be understood that pins will be used the diameters of which are such that they will substantially fit the holes in the eyelets. Such a machine, as illustrated in Fig. 2, may be a pulling-over and toe-lasting machine of the character disclosed in Letters Patent No. 1,980,435, to which the work is presented immediately after the assembling operation. Any other machine equipped with work-positioning pins arranged to enter the holes in the last may be used thereafter while the eyelets still remain in place. Before an outsole is applied to the shoe they will be removed by use of a suitable tool inserted under their heads.

While the invention is herein illustrated by reference to the use of a plurality of holes in the insole and in the last and a corresponding plurality of pins in a shoe machine, it is to be understood that it is not thus limited but is applicable to the use of a single hole and a corresponding pin if the work is positioned in a machine in the manner disclosed, for example, in Letters Patent No. 1,674,059, granted on June 19, 1928, on an application of A. F. Pym. In that case a single eyelet or like element will be used to position the insole on the last and to receive the pin. It will further be recognized that regardless of the manner of positioning the work in a shoe machine, eyelets used as herein illustrated serve as convenient, economical and effective means for positioning and holding an insole on a last, and such use of one or more eyelets is within the scope of the present invention. It is also to be understood that while conventional eyelets are herein shown, the invention in some of its aspects is not limited to the use of tubular members of that particular character.

Having described the invention, what I claim as new and desire to secure by Letters Patent of the United States is:

1. That improvement in methods of positioning insoles on lasts and of positioning the lasts and insoles in shoe machines, which consists in providing an insole and a last each with at least one hole so arranged that the hole in the insole will aline with the hole in the last when the insole is in proper relation to the last, inserting a tubular member in the hole in the insole and in the corresponding hole in the last to position the insole on the last, and utilizing a pin extending into the hole in said tubular member to position the last and insole in a shoe machine.

2. That improvement in methods of positioning insoles on lasts and of positioning the lasts and insoles in shoe machines, which consists in providing an insole and a last each with at least one hole so arranged that the hole in the insole will aline with the hole in the last when the insole is in proper relation to the last, inserting an eyelet in the hole in the insole and in the corresponding hole in the last with the head of the eyelet in engagement with the insole and the body of the eyelet tightly fitting the hole in the last to position and hold the insole on the last, and utilizing a pin extending into the hole in said eyelet to position the last and insole in a shoe machine.

3. That improvement in methods of positioning insoles on lasts and of positioning the lasts and insoles in shoe machines, which consists in providing an insole and a last each with a plurality of holes in its forepart so arranged that the holes in the insole will aline with the holes in the last when the insole is in proper relation to the last, inserting tubular members in the holes in the insole and in the corresponding holes in the last to position the insole on the last, and utilizing pins extending into the holes in said tubular members to position the last and insole in a shoe machine.

4. That improvement in methods of positioning insoles on lasts and of positioning the lasts and insoles in shoe machines, which consists in providing an insole and a last each with a plurality of holes in its forepart so arranged that the holes in the insole will aline with the holes in the last when the insole is in proper relation to the last, inserting eyelets in the holes in the insole and in the corresponding holes in the last with the heads of the eyelets in engagement with the insole and their body portions tightly fitting the holes in the last to position and hold the insole on the last, and utilizing pins extending into the holes in said eyelets to position the last and insole in a shoe machine.

5. That improvement in methods of positioning and holding insoles on lasts which consists in providing an insole and a last each with at least one hole so arranged that the hole in the insole will aline with the hole in the last when the insole is in proper relation to the last, and inserting an eyelet in the hole in the insole and in the corresponding hole in the last with the head of the eyelet in engagement with the insole and its body portion tightly fitting the hole in the last to position and hold the insole on the last.

AUGUST R. SCHOENKY.